(12) United States Patent
Hendrix

(10) Patent No.: US 7,769,655 B2
(45) Date of Patent: Aug. 3, 2010

(54) MULTIPLE CLIENT/USER AND CAPITAL MARKET FUNDED PARTICIPATING INTEREST IN QUALIFYING TRUST

(75) Inventor: Derrell J. Hendrix, Brookline, MA (US)

(73) Assignee: The RISConsulting Group LLC, Boston, MA (US)

( * ) Notice: Subject to any disclaimer, the term of this patent is extended or adjusted under 35 U.S.C. 154(b) by 892 days.

(21) Appl. No.: 11/108,557

(22) Filed: Apr. 18, 2005

(65) Prior Publication Data
US 2005/0234816 A1 Oct. 20, 2005

Related U.S. Application Data

(60) Provisional application No. 60/563,098, filed on Apr. 16, 2004, provisional application No. 60/652,771, filed on Feb. 14, 2005.

(51) Int. Cl.
*G06Q 40/00* (2006.01)
(52) U.S. Cl. .................................................. 705/35
(58) Field of Classification Search .................... 705/35
See application file for complete search history.

(56) References Cited

U.S. PATENT DOCUMENTS

| | | | |
|---|---|---|---|
| 5,802,500 A | 9/1998 | Ryan et al. | |
| 5,864,685 A | 1/1999 | Hagan | |
| 2003/0083975 A1* | 5/2003 | O'Grady et al. | ............ 705/37 |
| 2004/0059658 A1* | 3/2004 | Sosville | ............ 705/35 |

OTHER PUBLICATIONS

Kenneth Banks, Collateralized Loan Obligations: A Powerful New Portfolio Management Tool for banks, Mayer Brown Publications, 1998, 17 pages, www.mayerbrown.com/publications/article.asp?=2229&nid=6.*
A.M. Best Special Report: The treatment of surplus notes and trust preferred securities in the financial strength ratings of insurance insurance companies, Nov. 2003, 4 pages www.namic.org/pdf/03111OSRsurplusnotes.pdf.*
Standard and Poors Structured Finance Cash CDO of ABS Presale Report H2 Finance Ltd, Feb. 27, 2004, 7 pages, www.standardandpoors.com/spf/pdf/fixedincome/022704_H2Finance.pdf.*
International Search Report for Application No. PCT/US2005/013167.
Written Opinion for Application No. PCT/US2005/013167.
Standard & Poor's Depositary Receipt ("SPDRs") SPDR Trust, Series 1, Prospectus, pp. 1-84, Jan. 25, 2008.
SPDR® S&P500® ETF as of Jun. 30, 2008.

* cited by examiner

*Primary Examiner*—James P Trammell
*Assistant Examiner*—Abdul Basit
(74) *Attorney, Agent, or Firm*—Fish & Richardson P.C.

(57) ABSTRACT

Methods and apparatus, including computer program products, for multiple client/user and capital market funded participating interest in qualifying trust. Methods include establishing a legal trust that holds assets and issues obligations that grant participation rights in its assets. The legal trust can be a legal qualifying trust. The legal qualifying trust can grant participation rights to multiple beneficiaries or participants.

22 Claims, 5 Drawing Sheets

MULTIPLE CLIENT/USER AND CAPITAL MARKET FUNDED PARTICIPATING INTEREST IN QUALIFYING TRUST

CROSS-REFERENCE TO RELATED APPLICATIONS

This application claims priority based on U.S. Provisional Patent Application No. 60/563,098 for PARTICIPATING INTEREST IN QUALIFYING TRUST, filed Apr. 16, 2004, and U.S. Provisional Patent Application No. 60/652,771 for PARTICIPATING INTEREST IN QUALIFYING TRUST, filed Feb. 14, 2005, the disclosures of which are incorporated here by reference in their entirety.

BACKGROUND OF THE INVENTION

The present invention relates to data processing by digital computer, and more particularly to multiple client/user and capital market funded participating interest in qualifying trust.

There are a variety of forms of collateral that are used to credit enhance or secure obligations under various agreements.

United States (U.S.) insurance companies and reinsurance companies rely on off-shore reinsurance carriers as an important source of capital. Under U.S. state insurance regulations, non-US domiciled reinsurance companies (including captives of corporations that self-insure workers compensation coverage for workers) are classified as non-admitted carriers for U.S. insurance regulatory purposes. In order for reinsurance purchased from non-admitted carriers to provide U.S. cedants with reserve credit or surplus relief, U.S. state regulations require non-admitted carriers to post qualifying collateral.

Qualifying collateral may include, for example, cash, securities listed by the Securities Valuation Office of the National Association of Insurance Commissioners (NAIC) and qualifying as admitted assets (e.g., the qualifying assets) that are placed in a qualifying trust, Letters of Credit (LOCs) that are either issued or confirmed by banks domiciled in the U.S. or by U.S. branches of foreign banks that are approved by the NAIC, and in an acceptable form (e.g., clean, irrevocable, unconditional and "evergreen"), and any other form of security acceptable to the various state insurance commissioners.

At Lloyd's of London ("Lloyds"), members are required to maintain capital equal to a calculated percentage of approved insurance capacity. Such capital at Lloyd's, which is maintained in addition to and together with premiums received from the business written by the member at Lloyd's on a rolling 4 years-of-account basis, can take the form of cash, qualifying securities or 4-year LOCs.

In addition, large buyers of insurance and reinsurance require that their insurance and reinsurance providers be credit-enhanced to alleviate risk-based capital charges and/or individual insurance company and/or reinsurance company credit concentrations.

SUMMARY OF THE INVENTION

The present invention provides methods and apparatus, including computer program products, for participating interests in qualifying trusts.

In an aspect, the invention features a method including establishing a legal trust that holds assets and issues obligations that grant participation rights in its assets.

In embodiments, the legal trust can be a legal qualifying trust. The legal qualifying trust can grant participation rights to multiple beneficiaries or participants. The assets can be financed by third parties unrelated to a holder of the participation rights. The obligations can be collateral notes.

The collateral notes can be used in place of other instruments to satisfy regulatory requirements of state insurance regulators with respect to credit for reinsurance regulations. The collateral notes can be cashless. The collateral notes can be used to credit enhance contingent payment obligations of one entity to another entity, the collateral notes serving as a primary payment mechanism. The collateral notes can be used to credit enhance contingent payment obligations of one entity to another entity, the collateral notes serving as a contingent payment mechanism.

The participation rights provide a first lien on assets. The participation rights can be participation certificates. The participation certificates can be collateral notes.

The assets can be funded at reduced cost (compared to individually structured trusts). The reduced cost can result from a pooling of risk from multiple participants. The reduced cost can result from application agreements granting a collateral note issuer certain rights in relation to underlying commercial transactions for which the collateral can be required and reduces an obligor credit risk. The reduced cost can result from rating agencies and investors using a stochastic model of combined risk of underlying commercial transactions secured by rights and a default of an obligor.

In another aspect, the invention features a method including establishing a legal trust granted by an insurer in support of a performance guarantee in favor of a financing provider, the financing provider having a right to collateral notes deposited into the trust.

In embodiments, the legal trust can be a legal qualifying trust.

In another aspect, the invention features a method including establishing a trust to provide security for self-insured workers compensation obligations, a company pledging certain commercial assets or cash flows as security to obtain a deposit of collateral notes.

In embodiments, the collateral notes can be cashless.

The invention can be implemented to realize one or more of the following advantages.

The form of collateral offered provides qualifying collateral under existing NAIC and state conditions/regulations, and a non-consolidating (e.g., off-balance-sheet) form of collateral. The form of collateral provides a multi-year commitment of flexible capacity, fixed pricing, and a non-aggregating (non-cannibalizing) source of capacity based on a risk assessment that takes into account risk-mitigating cash flows and other rights relating to the underlying insurance business and/or reinsurance contracts.

BRIEF DESCRIPTION OF THE DRAWINGS

Like reference numbers and designations in the various drawings indicate like elements.

DETAILED DESCRIPTION

The demand for reinsurance collateral for statutory surplus relief and for credit enhancement is growing rapidly, and its size is so substantial that cost and availability of collateral are critically important issues for those reinsurers and others that must post collateral. This trend, and the fact that reserve requirements related to life policies continue to grow substantially many years after the policies are issued, have been cited by various authorities expressing serious concern about both the availability of collateral over time and the structural shortcomings of traditional forms of collateral, particularly letters of credit. At the same time, changes in bank risk-based-capital guidelines have contributed to a tightening of terms for traditional letters of credit, which have historically been the collateral instrument of choice for companies that require collateral. As a result, many companies (including the offshore affiliates or foreign insurance companies doing business in the U.S., Members of Lloyd's and domestic and international companies doing business in the U.S., the companies) are seeking alternative sources of qualifying collateral that provide a multi-year commitment of capacity, increased size and flexibility of capacity, fixed pricing set at competitive levels or levels that more accurately reflect the likelihood of a loss to the collateral provider, a source of non-cannibalizing capacity with respect to existing bank lines, and a form of collateral that avoids additional balance sheet leverage (e.g., increase assets and debt) under existing accounting rules and interpretations or rating agency criteria.

Certain segments of the market will also require that such alternatives satisfy all existing state insurance requirements with respect to U.S. statutory surplus relief and/or reserve credit for reinsurance or other market (e.g., Lloyd's) or regulatory requirements (e.g., NAIC or German insurance regulations).

Figure 1:
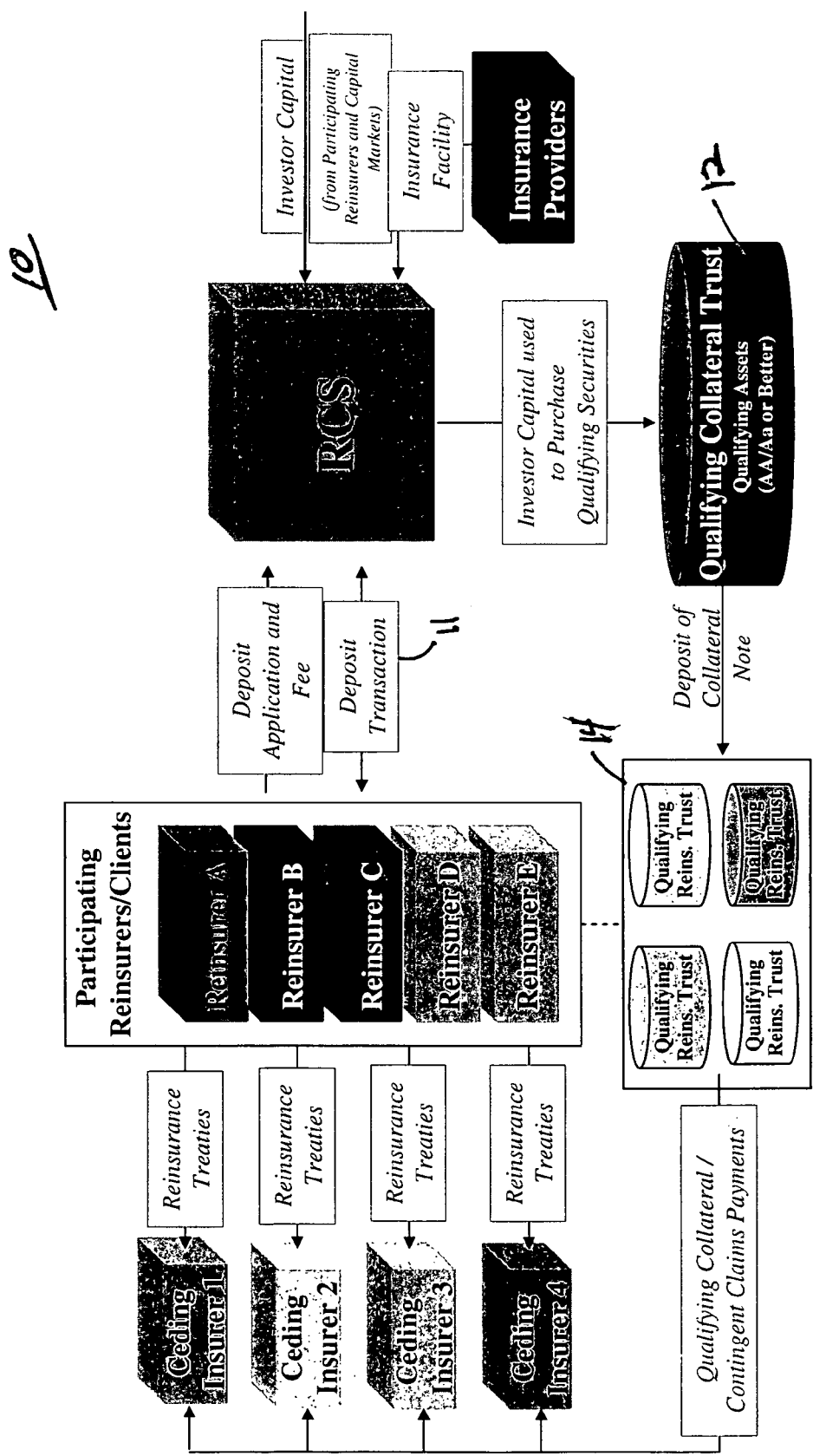
FIG. 1 is a block diagram.

As shown in FIG. 1, an architecture 10 is a foundation for providing the insurance market with up to $10 billion in collateral in the form of demand collateral notes (e.g., the collateral notes) that qualify under United States (and possibly other national) insurance laws and a high quality of security to its beneficiaries. The collateral notes function like, and serve as a practical alternative to, traditional reinsurance letters of credit and individually funded trusts, and are backed by qualifying assets funded in the capital markets.

The risk characteristics of the insurance and reinsurance business and the specifics of insurance regulations governing qualifying collateral present a unique opportunity for both capital markets investors and reinsurers. Investors interested in highly rated, asset-backed paper will benefit from unique, non-correlating returns tied to reinsurance collateral transactions while at the same time providing reinsurance companies a large, stable alternative source of collateral for both credit enhancement and statutory surplus relief.

The architecture 10 employs structural, forward-looking models to analyze the risk associated with the liabilities (e.g., RCS model). The RCS model combines an analysis of collateral transactions (each a deposit transaction 11) with an analysis of the asset portfolio. Each deposit transaction 11 is modeled independently in order to analyze the combined risk of losses relating to underlying commercial contracts (e.g., insurance and performance guarantees) and the migration/default risk of the respective company obligor, net of recoveries, which produces a new differentiated risk class of contingent (i.e., insurance-linked) credit risk and serves as the basis for rating and pricing the deposit transactions 11. This integrated modeling approach enables access to funding from sophisticated investors seeking greater transparency to support rigorous risk/return assessment.

By establishing a more accurate estimation of the risk associated with collateral transactions, the architecture 10 facilitates the development of a significant long-term source of capacity for such collateral. It also represents a large, sustainable investment class for investors, given the size and growth prospects for insurance/reinsurance collateral worldwide.

The architecture 10 enables qualifying collateral to non-admitted reinsurance carriers to support their reinsurance collateral obligations. The form of collateral offered is superior to currently available alternatives in that it provides a multi-year commitment of flexible capacity, fixed pricing, a unique, qualifying form of collateral (e.g., a collateral note, described below) under existing U.S. insurance/regulations, a balance sheet neutral form of collateral, and a non-aggregating (non-cannibalizing) source of capacity, financed primarily by capital markets investors interested in rated, contingent-credit paper.

To provide this collateral, the architecture 10 is used to establish a legal, qualifying Delaware trust 12 (the Qualifying Collateral Trust or QCT), which holds up to, for example, $10 billion in cash and qualifying assets. The trust 12 issues collateral notes that are backed by the assets held in the trust 12. The terms of the trust 12 will restrict distribution of the qualifying assets in conformity with applicable insurance laws.

The collateral notes are issued only to clients for deposit into Qualifying Reinsurance Trusts (QRTs) 14 established by them. The collateral notes represent a cashless obligation of the QCT 12, supported by a first lien on the assets in the trust. The collateral notes are issued in U.S. dollars in varying denominations and, once issued, are perpetual in duration until surrendered or sold by the holder. The collateral notes have a one-year maturity and an interest coupon equal to six (6) months LIBOR flat once delivered to a cedant or sold to third parties. The collateral notes are rated A or better by at least one major rating agency based on the quality of assets held in the QCT 12. The collateral notes are freely marketable if drawn by ceding companies.

In order for U.S. ceding companies to obtain reserve credit, the collateral note is deposited into a qualifying form of Section 114 Trust or other similar credit for reinsurance trust (e.g., QRT 14) and granted by the client in favor of U.S. ceding companies. The QRTs 14 are in compliance with the relevant cedants' reserve credit for reinsurance requirements in the various states. Each QRT 14 is managed by a trustee who will exchange collateral notes for cash or assets held in the QCT 12, for distribution to the ceding insurer, when instructed by the ceding insurer (i.e., a note conversion).

Figure 2:
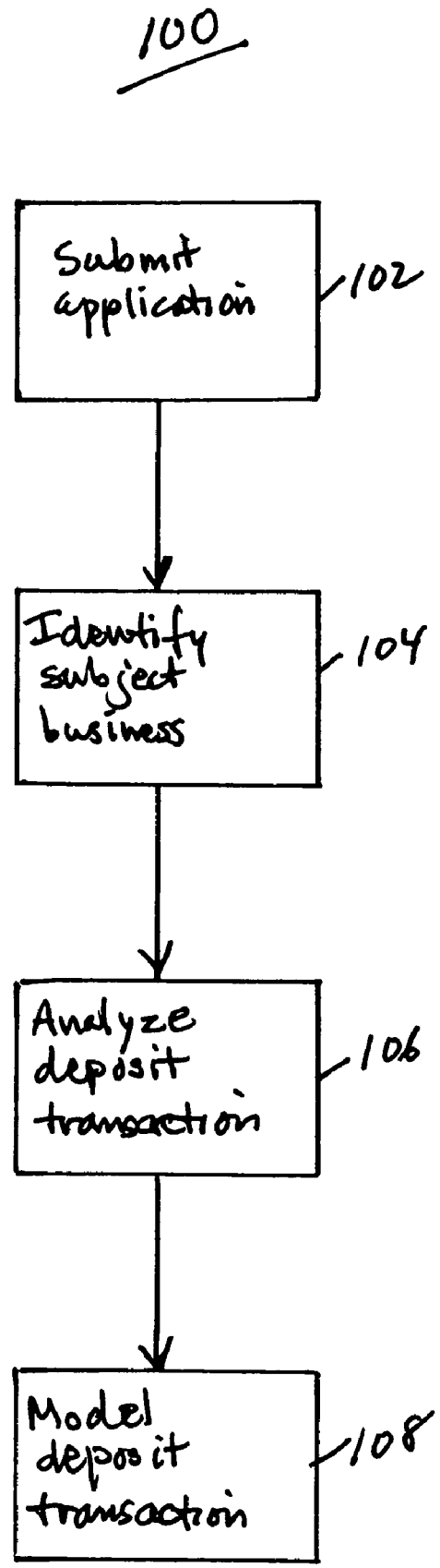
FIG. 2 is a flow diagram.

As shown in FIG. 2, a deposit transaction process 100 enables one to obtain the right to receive a deposit of a collateral note into their qualifying reinsurance trusts. Process 100 includes clients submitting (102) an application and identifying (104) the underlying reinsurance treaties or business (the subject business) to be supported and the ultimate reimbursement obligor (the obligor). Process 100 analyzes (106) and models (108) each deposit transaction 11 with the aid of a stochastic model (the model). The model is used to measure the combined risk of a reinsurance claim, a client/obligor default and the likelihood and amount of any recovery under other security arrangements. The model is used to estimate the probability distribution of deposit transaction 11 losses, which will then be used (a) to affirm the appropriate risk tranching (rating) of the subject business that will be supported by the QCT collateral; (b) to establish underwriting terms between RCS and the client; and (c) to provide indicative deposit transaction 11 fee pricing for the deposit transaction 11.

Process 100 varies by line of business. Process 100 only considers deposit transactions 11 for which obligor credit risk is materially enhanced by underlying insurance/reinsurance business conditions and/or cash flows for which other risk-mitigating resources are available (e.g. future interest payments), and for which process 100 can obtain a security interest. Accordingly, all deposit transactions 11 require a minimum client claims paying rating of BBB+/Baa1 or equivalent, a double trigger (or better) mechanism be established, and a legal opinion for the respective client domicile evidencing a valid security interest in, and subrogation rights to, the subject business or other cash flows, rights or assets.

Deposit transactions 11 will be priced at market rates for similar collateral arrangements (such as bank LOCs) for comparably rated obligors, taking into account the tenor of the desired transaction. Deposit transaction 11 fees will be calculated as a percentage of the face value of the collateral notes outstanding each year for the underlying deposit transaction 11, and will be payable in advance on a net present value basis.

Figure 3:
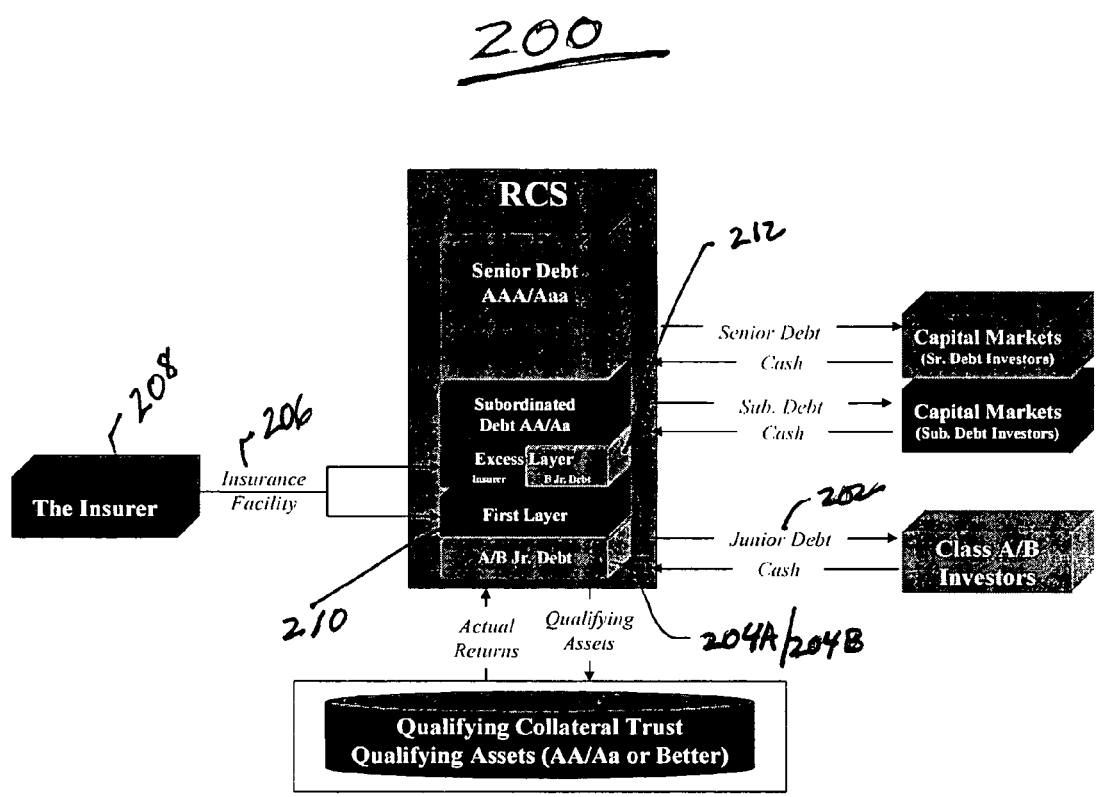
FIG. 3 is a block diagram.

A capital structure 200 is shown in FIG. 3. To support its collateral obligations and to raise the proceeds required to finance the acquisition of assets for the qualifying collateral trust 12, the architecture 10 enables issuance of up to, for example, U.S. $10 billion in three tranches of debt. A junior debt 202, equal to, for example, at least 3% of assets (up to a maximum of $300 million at inception), is privately placed with 5-15 insurance companies, reinsurance companies and/or their insurance affiliates (the client investors) in two classes.

A class A junior debt 204A is issued in an amount of, for example, between $150 and $300 million at initial closing. The class A junior debt 204A will bear (up to its limit) losses to the architecture 10 stemming from the performance of the asset portfolio and losses stemming from its individual deposit transactions 11 (the client retention). Class A junior debt 204A will earn a return based on the performance of the asset portfolio net of financing and certain program costs, plus a rate of interest on the balance of an unearned premium reserve.

A class A junior debt 204A may be converted to class B junior debt 204B of equal face value, at any time (subject only to a notice period). Class B junior debt 204B will bear (up to its limit) losses stemming from the performance of any combination of the asset portfolio, its or its affiliate's individual deposit transactions 11, and from all other (i.e., non-affiliated company deposit transactions 11 on a shared basis with an insurance facility. Class B junior debt 204B will earn a return based on the performance of the asset portfolio net of financing and certain other program costs, plus a proportional share of the returns associated with the deposit transactions 11 (the deposit transaction returns).

The subordinated debt, equal to between, for example, 4% and 7% of assets (up to a maximum of $700 million at closing), is placed with capital markets investors in a 144A offering. The subordinated debt bears both asset portfolio and deposit transaction 11 losses (up to its limit) that exceed the risk-bearing resources of the junior debt and/or the insurance facility. The subordinated debt is rated A and will be issued with a coupon of six-month LIBOR plus a spread of, for example, between 1.00% and 1.50%, have a final maturity of 20 years, and may be callable in years 10 and 15.

The senior debt, equal to, for example, up to 93% of assets (up to a maximum of $9.3 billion) is placed with capital markets investors through a 144A offering. The senior debt bears both asset portfolio and deposit transaction 11 losses exceeding the risk-bearing resources of the junior debt, the insurance facility and the subordinated debt. The senior debt is rated AAA, and issued in a range of maturities appropriate to an asset and liability management criteria. The coupon at issuance is LIBOR-based (London Interbank Offered Rate) at market levels corresponding to the maturity of notes issued.

Deposit transaction risk 11 is credit-enhanced by an insurance cover (the insurance facility 206) to be provided by a AAA/Aaa rated insurer 208. The insurance facility 206 covers losses on deposit transactions 11 that exceed the individual client retentions of both class A and class B junior debt (the insured losses), up to a limit of $570 million in two layers, as follows:

A first layer 210, to be provided by the insurer 208, will cover deposit transaction 11 losses in excess of the client retention(s) up to a limit of, for example, $270 million, and the excess layer 212 will cover deposit transaction 11 losses in excess of the client retention(s) and the first layer 210, up to a limit of, for example, $300 million (the excess layer 212). The excess layer 212 is provided by the insurer and the class B junior debt on a pari-passu basis.

The deposit transaction 11 fees collected, net of an override, are paid to the insurer 208 as premiums (the premiums) for the insurance facility 206, which is managed in a shadow account (e.g., an unearned premium account).

Proceeds from debt issuance are used to acquire securities to be placed in the QCT 12 and managed as an asset portfolio. The investment guidelines of the asset portfolio comply with the investment limitations of New York State Insurance Regulation 114, and include securities listed by the Securities Valuation Office of the NAIC. In general, these limitations require that all securities within the asset portfolio bear a minimum rating of A– or equivalent, and that the overall portfolio maintain an average rating of AA–. Investment guidelines are subject to pre-approval by junior debt investors, and stipulate concentration limits by issuer, type and sector, and duration limits on a percentage composition and/or nominal value basis. An investment objective of the asset portfolio emphasizes yield over liquidity considerations, and is managed by one or more third party investment managers to optimize the trade-offs between yield, liquidity and complexity within its quality and qualification guidelines.

The earnings on the assets in the QCT 12 are a source of income for the RCS model and are used to support interest payments on all of the debt, fund management expenses and other program costs.

While held within the QRT 14, the collateral note remains a cashless obligation of the QCT 12 supported by a first lien on the assets of the trust. Upon a note conversion, whether held by a cedant or sold, the collateral notes become an interest-bearing obligation with a one-year maturity and an interest coupon equal to six (6) month LIBOR flat, for example.

A cedant can withdraw a collateral note at any time. The cedant can hold the collateral note as an investment, sell the collateral note in the capital markets, or exchange the collateral note for cash and/or securities of the QCT 12 in an amount equal to the collateral note's pro-rata share of the market value of the QCT 12 at the time of exchange. A cedant may also direct the QCT 12 trustee to either sell or redeem the collateral note on its behalf, and deposit the proceeds in either cash or securities directly into the cedant's QRT 14.

A note conversion gives rise to a client/obligor reimbursement obligation for the full conversion amount. If a client fails to re-pay the drawn amount according to the terms specified in the deposit transaction 11 contract, RCS (encompassed in architecture 10) will be subrogated to the rights of the defaulting client under the subject business treaty. Pursuant to the subrogation, RCS may have a security interest in cash flows related to any subject business treaty, and/or to other cash flows or assets, which will be clearly documented in the deposit transaction 11 contract.

The client will also have an obligation to pay interest on any drawn, unpaid amount under the collateral notes.

Architecture 10 enables earning a spread between the return on assets and the cost of its liabilities. Historical returns from portfolios structured in conformity with quality/qualification guidelines of U.S. state reinsurance regulations and Securities Valuation Office (SVO) criteria have ranged from LIBOR+15 basis points to LIBOR+50 or more basis points depending upon the specific guidelines approved.

In addition, clients pay commitment fees on the unused allocated portion of collateral capacity at a rate of 0.1% per annum, for example, payable monthly in advance, until such time as a client enters into a deposit transaction 11.

Clients pay deposit transaction 11 fees on the face amount of collateral notes issued on their behalf at a market rate for similar collateral arrangements (such as bank letters of credit at the margin). At present, comparable rates range between 45 and 100 basis points per annum, depending on individual client claims-paying ratings and the combined (i.e., default/subject business) risk analysis. Deposit transaction 11 fees are paid in advance on a net present value basis calculated for each deposit transaction 11, at a discount rate and methodology mutually agreed upon.

In the event that a collateral note is sold, drawn, redeemed or otherwise converted to cash, interest bearing or securities form by a beneficiary, the client will be obligated to reimburse the RCS model and to pay interest on pre-agreed terms on the outstanding amount of the collateral notes. This interest rate may be as high as prime.

Figure 4:
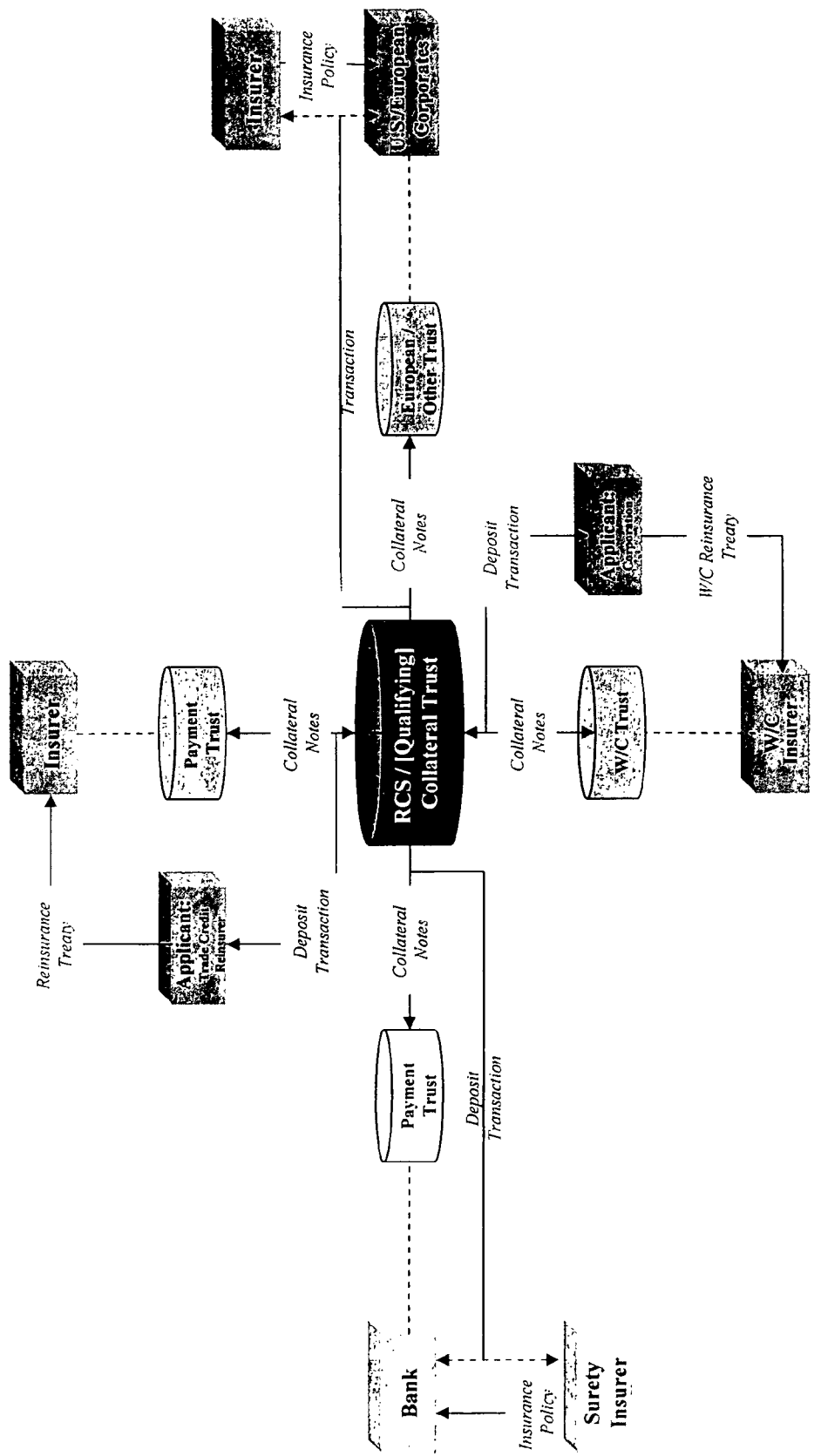
FIG. 4 is a block diagram.
Figure 5:
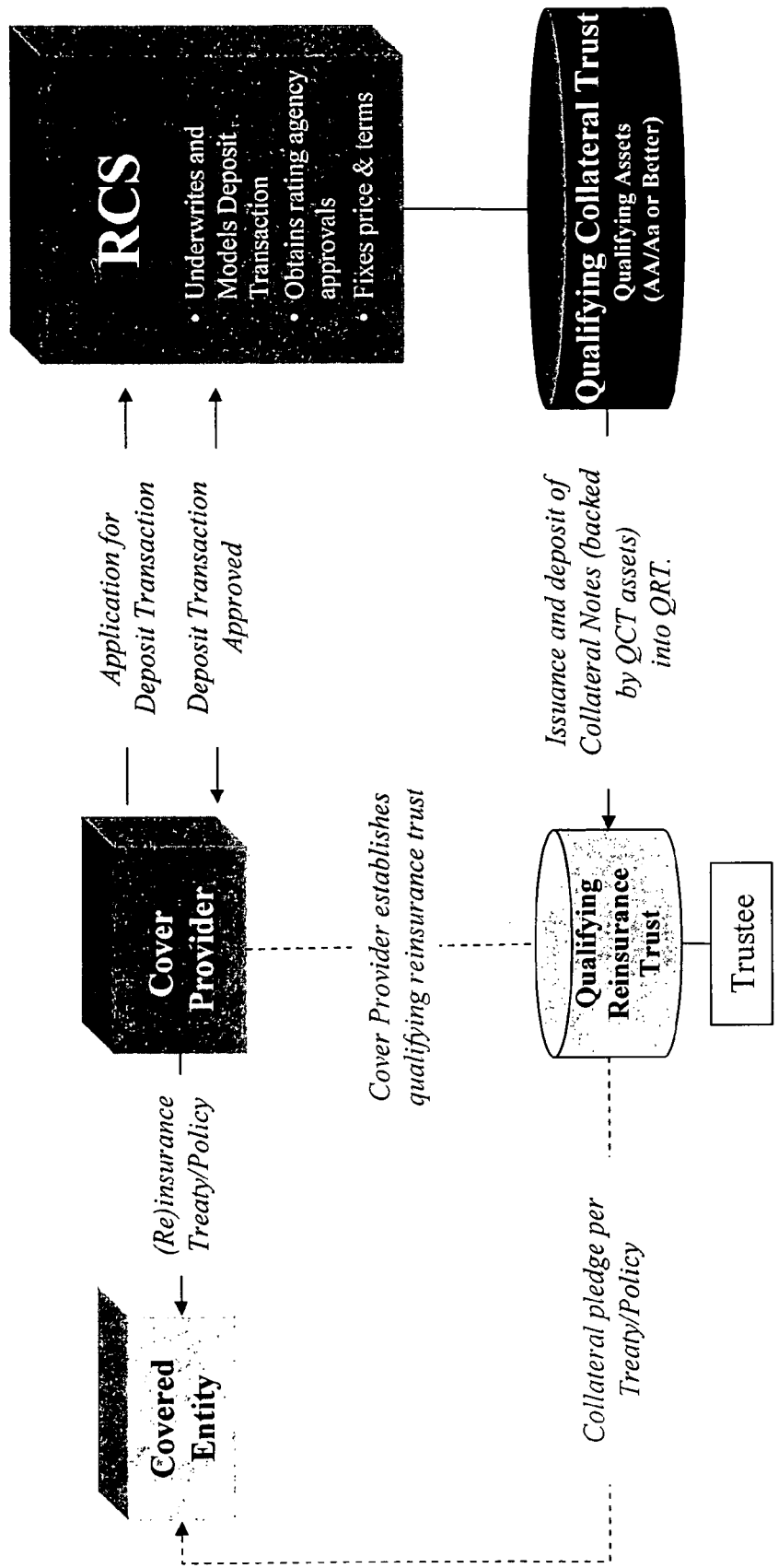
FIG. 5 is a block diagram.

As shown in FIGS. 4 and 5, the architecture 10 can be used in non-regulatory examples. As described above, the collateral notes issued may be used to credit enhance contingent payment obligations of one entity (i.e., the obligor) to another entity (i.e., the beneficiary) and may serve as the primary or contingent (e.g. following the obligor default) payment mechanism.

Entities required to provide collateral or credit enhancement for potential payment obligations may enter into collateral transactions to obtain high quality collateral.

The collateral provided may be applied to collateralize or credit enhance a variety of contract types.

In a trade credit reinsurance example, buyers of trade credit reinsurance are increasingly concerned about the credit quality of their reinsurance providers. To reduce the risk of non-payment, some insurers require their reinsurance counter parties to provide collateral against potential losses in excess of premiums. Trade credit reinsurers may use collateral notes to secure contingent payment obligations. In the event of a reinsurer default, RCS must have rights to any remaining profits and other cash flow from the reinsurance treaty.

RCS may be used to issue collateral notes against trade credit reinsurance losses exceeding an agreed attachment point (e.g., 120% of premiums). The collateral notes will credit enhance the reinsurer by providing additional security and reduce unsecured credit exposure, up to a limit.

The Collateral Note application and reimbursement agreement may provide for obtaining certain rights in the event of a reinsurer default, including the right to a release of Collateral Notes not required to support the trade credit reinsurance treaty, the value of future profits, other rights due to the reinsurer under the trade credit reinsurance treaty, or other assets or cash flows.

In a surety insurance example, financing banks purchase surety insurance to guarantee the performance obligations of contractors. (e.g., ship builders). Banks may use collateral notes to credit enhance surety insurers. In the event of contractor non-performance and a surety insurer default, RCS may have rights to underlying physical assets (e.g., in a ship finance transaction, the ship).

RCS can be used to issue collateral notes against a significant portion of the surety insurance amount. The collateral notes will credit enhance the surety insurer and protect the bank against losses related to a surety insurer default. The collateral notes will be secured by the surety's right.

The collateral note application and reimbursement agreement will provide for obtaining certain rights in the event of a surety insurer default, including the right to a release of collateral notes not required to support repayment of the loan to the bank, full reimbursement rights against the assets of the surety writer (the insurer), and rights to the ship and/or the value of any proceeds from the sale of the ship.

In an insurance credit enhancement example, corporations purchase large volumes of insurance and sometimes find it difficult to purchase the required coverage limits without exceeding insurer credit risk exposure limits. Corporations/insurers may use collateral notes to credit enhance the insurance providers allowing them to increase the amount of cover purchased without assuming the related credit risk. In the event of claims and an insurer default, RCS must have rights to specified assets (e.g., recoverables) of the insurer.

To support this application, RCS will analyze the combined risk of insurer losses exceeding the approved limit for the insurer in question, the insurance provider's default probability, and the correlation between the underlying insurance risk and the insurer default risk. RCS will also analyze and model the probability of claims on a portfolio of insurance companies exceeding a specified dollar limit for stipulated lines of business to determine the combined probability distribution of aggregate losses exceeding the limit and a default by one of more of the insurers.

If the above analysis supports a sufficiently low probability of loss and its other underwriting criteria are met, RCS will issue collateral notes to facilitate increases in insurance limits.

In a worker's compensation example, U.S. corporations purchase worker's compensation from U.S. insurance carriers who transfer the expected losses by purchasing reinsurance from an affiliate of the corporate (e.g. a captive insurer). The captive insurance affiliates of the insured corporation are typically required to fully collateralize their reinsurance obligations with qualifying collateral and may use collateral notes to cover these security requirements. In the event of claims and a captive insurer default, RCS will have rights to corporate assets or cashflows to support recovery in the event of a collateral notes draw.

RCS is used to issue collateral notes against a significant portion of the reinsured amount. The collateral notes will credit enhance the captive insurer and protect the insurer against losses related to a captive insurer default.

The collateral note application and reimbursement agreement will allow obtaining certain rights in the event of a captive insurer default, including the right to a release of collateral notes not required to support payment losses to the insurer, and rights to any remaining premiums or other corporate assets of the company.

As described above with reference to process 100, to enter into a deposit transaction, reinsurers will submit an application and identify the underlying insurable risks (the subject risks) to be supported by the collateral note, the ultimate reimbursement obligor (i.e., the reinsurer or its guarantor, the obligor), and any other sources of repayment available (e.g., rights under subject risk treaties, reinsurance recoverables and/or other assets).

Process 100 will analyze and model, using a stochastic forward-looking model, the combined risk of subject risk claims/losses, an obligor default and recovery under other security arrangements to estimate a probability analysis of deposit transaction losses (e.g., a risk distribution).

The combined risk probability analysis is used to support the tranching, shadow rating and pricing of deposit transactions. After a deposit transaction is shadow rated, process 100 negotiates final underwriting (e.g., price and tenor) terms with the respective reinsurer pursuant to executing the deposit transaction.

The architecture 10 can be used for reinsurance collateral for Regulation XXX statutory reserve or surplus relief. Many reinsurers use reinsurance LOCs to support Regulation XXX reinsurance collateral requirements, but incur unacceptable risk in relation to periodic rollover risk (e.g., price and capacity) at short-term LOC expiry dates (e.g., less than 10 years). Collateral notes can be used to support the collateral requirements for all or part of the difference between the full statutory reserve and the reinsurer's Generally Accepted Accounting Procedures (GAAP) reserve amount.

The collateral note application and reimbursement agreement will provide for obtaining certain rights in the event of a reinsurer default, including the right to a release of Collateral Notes not required to support reinsurer obligations in respect of the Subject Business (e.g., statutory reserves); if collateral notes are used to pay claims, the right to all subsequent subject business profits (e.g., subrogation rights to releases back to the reinsurer) in order to support recovery of drawn amounts; and the right to pursue a defaulted reinsurer for reimbursement/recovery. In addition, RCS will assume the right of the reinsurer to receive interest on collateral amounts drawn by cedants prior to any default, which is provided in the underlying reinsurance treaties.

In a non-admitted standard property reinsurance example, the RCS model is used to analyze and model the ceded reserves to assess the key drivers of performance (e.g., inflation, acceleration and interest rate risks) and to determine the appropriate collateral advance rate and pricing. If the assessment of the combined risk (e.g., reserve risk, security risk and reinsurer default risk) is favorable, collateral notes will be issued on a "first out" basis for a limited maturity (e.g., 3-5 years).

The collateral note application and reimbursement agreement will provide for, in the event of a reinsurer default, obtaining subject business rights (e.g., subrogation of rights contained in underlying reinsurance treaties) and/or rights to other Security, which together may include the right to any releases by the cedant of drawn collateral note proceeds for any reason (i.e., treaty termination or a reduction in collateral required to support reserve requirements) plus related accrued interest; if collateral note drawings are used to pay claims and are therefore not likely to be returned, the rights to subsequent subject business profits; and the right to receive the benefit of any soft assets (e.g., payments of future interest and/or under retrocessional reinsurance policies).

In a loss portfolio transfer example, collateral notes could be used to replace a significant amount of the difference between the Net Present Value (NPV) of expected loss payments and the full nominal value of the losses.

The collateral note application and reimbursement agreement will provide for obtaining certain rights in the event of a reinsurer default, including the right to a release of collateral notes not required to support trust account obligations on a whole-of-trust account/first-out basis, the right to all subsequent interest payable in relation to trust account assets when paid, if Collateral Notes are used to pay claims, inter alia, the right to any recoverable from cedants.

Non-admitted reinsurers are required to establish reserves (funded with assets) against cedant-reported claims that are incurred but not yet reported (IBNR). Collateral notes can be used to replace a significant portion of the excess IBNR requirement.

In a standard property reinsurance supported by retrocessional reinsurance example, collateral notes can be issued for a significant amount of the reserves against such recoverables payments. The collateral notes would release an amount of reinsurer assets in relation to the value of collateral notes deposited. The released assets could be used to support other business(es) or could be invested according to less stringent guidelines.

In a Lloyd's example, corporate members (the Members) of the insurance market write multi-line insurance business through Lloyd's. While total insurance premium income is generally expected to exceed the cost of claims, claims may exceed premiums. For this reason, Lloyd's requires additional capital of its Members, to support the business underwritten and, if necessary, pay outstanding claims in excess of premiums. Each Member of Lloyd's is required to provide capital known as Funds at Lloyd's as security to support their total Lloyd's underwriting business. The level of Funds at Lloyd's determines the amount of insurance business a Member can underwrite. The amount of funds required from Members will vary, depending on the perceived level of risk in the business which they underwrite. This is known as "risk-based capital" or RBC. Funds at Lloyd's are held under trusteeship of Lloyd's in the form of readily realizable assets such as cash or bank letters of credit. Funds at Lloyd's are exposed if losses from any underwritten business for subject years of account exceed premiums collected.

RCS can issue Collateral Notes to Members of Lloyd's to support their Funds at Lloyd's requirements. RCS may require a parent guarantee. RCS would be exposed to at least a double trigger risk, insomuch as a loss will only occur if the Member's losses exceed premiums, the Member fails to pay the losses, and the Member's guarantor (e.g., its parent company) fails to reimburse RCS for any drawn Collateral Note amounts.

To support these applications, RCS will analyze the combined risk of Member portfolio losses exceeding aggregate premiums for the 4 years of account being covered, the Member/guarantor default probability, and the correlation between the underlying insurance risk and the default risk. If the above analysis supports a sufficiently low probability of loss and its other underwriting criteria are met, RCS would be prepared to issue Collateral Notes to support the Funds at Lloyd's requirement of Members.

The Collateral Note application and reimbursement agreement will provide for RCS to obtain certain rights in the event of a Member's default, including the right to a release of Collateral Notes not required to support loss payments, and rights to other assets of the Member or its guarantor.

The invention can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

What is claimed is:

1. A computer-implemented method, the method comprises:
   establishing, by one or more computers, a legal trust that holds assets financed by third-party investors;
   recording, by the one or more computers, issuance of obligations backed by the assets in the trust, the obligations granting to a first party at least a first participation right that grants to a second party a right to partially draw against the assets of the trust based on performance of the first party; and
   recording, by the one or more computers, receipt of a guarantee that is given in exchange for the first participation right, the guarantee being given to the legal trust by the first party to fully redeem, at a future time, the assets in the trust that are partially drawn against.

2. The computer-implemented method of claim 1 wherein the legal trust is a legal qualifying trust.

3. The computer-implemented method of claim 2 wherein the legal qualifying trust grants participation rights to multiple beneficiaries or participants.

4. The computer-implemented method of claim 1 wherein the assets are financed by third parties unrelated to a holder of the participation rights.

5. The computer-implemented method of claim 1 wherein the obligations are collateral notes.

6. The computer-implemented method of claim 5 wherein the collateral notes are used in place of other instruments to satisfy regulatory requirements of state insurance regulators with respect to credit for reinsurance regulations.

7. The computer-implemented method of claim 5 wherein the collateral notes are cashless.

8. The computer-implemented method of claim 5 wherein the collateral notes are used to credit enhance contingent payment obligations of one entity to another entity, the collateral notes serving as a primary payment mechanism.

9. The computer-implemented method of claim 5 wherein the collateral notes are used to credit enhance contingent payment obligations of one entity to another entity, the collateral notes serving as a contingent payment mechanism.

10. The computer-implemented method of claim 1 wherein the participation rights are a first lien on assets.

11. The computer-implemented method of claim 1 wherein the participation rights are participation certificates.

12. The computer-implemented method of claim 11 wherein the participation certificates are collateral notes.

13. The computer-implemented method of claim 1 wherein the assets are funded at reduced cost.

14. The computer-implemented method of claim 13 wherein the reduced cost comprises a pooling of risk from multiple participants.

15. The computer-implemented method of claim 13 wherein the reduced cost comprises application agreements granting a collateral note issuer certain rights in relation to underlying commercial transactions for which the collateral is required and reduces an obligor credit risk.

16. The computer-implemented method of claim 13 wherein the reduced cost comprises rating agencies and investors results using a stochastic model of combined risk of underlying commercial transactions secured by rights and a default of an obligor.

17. A computer-implemented method, the method comprises:
    establishing, by one or more computers, a legal trust providing collateral to an insurer of a performance guarantee in favor of a financing provider;
    recording, by the one or more computers, issuance of the provided collateral in the form of collateral notes backed by investor-financed assets held in the trust, the collateral notes granting to the insurer at least a first participation right, that grants to the financing provider a right to partially draw against the assets of the trust based on performance of the insurer; and
    recording, by the one or more computers, receipt of a guarantee that is given in exchange for the first participation right, the guarantee being given to the legal trust by the insurer to fully redeem at a future time the assets in the legal trust that are drawn against.

18. The computer-implemented method of claim 17 wherein the legal trust is a legal qualifying trust.

19. A computer-implemented method, the method comprises:
    establishing, by one or more computers, a trust to provide qualifying collateral to a company that self-insures workers compensation coverage;
    Recording, by the one or more computers, receipt by the company of a deposit of collateral notes backed by investor-financed assets held in the trust, and the collateral notes granting to the company at least a first participation right that grants to workers a right to partially draw against the assets of the trust based on performance of the company, the deposit being provided in exchange for the company pledging certain commercial assets or cash flows to guarantee full redemption of the collateral notes at a future time.

20. The computer-implemented method of claim 19 wherein the collateral notes are cashless.

21. The computer-implemented method of claim 1 wherein the second party is a party that obtains insurance from the first party and the second party partially draws against the assets in the trust when the first party defaults.

22. The computer-implemented method of claim 1 wherein the first party is a reinsurance company and the obligations are in the form of collateral notes to be deposited in a reinsurance trust, and the second party partially draws against the assets in the trust when the first party fails to meet a reinsurance obligation.

* * * * *

UNITED STATES PATENT AND TRADEMARK OFFICE
CERTIFICATE OF CORRECTION

PATENT NO. : 7,769,655 B2  Page 1 of 1
APPLICATION NO. : 11/108557
DATED : August 3, 2010
INVENTOR(S) : Derrell J. Hendrix It is certified that error appears in the above-identified patent and that said Letters Patent is hereby corrected as shown below:

Column 12, Line 29, in Claim 16, after "investors" delete "results".

Column 12, Line 56, in Claim 19, delete "Recording," and insert -- recording, --, therefor.

Signed and Sealed this
First Day of February, 2011

David J. Kappos
*Director of the United States Patent and Trademark Office*